(12) United States Patent
Movshovich et al.

(10) Patent No.: US 6,882,345 B2
(45) Date of Patent: Apr. 19, 2005

(54) METHOD AND SYSTEM FOR EFFICIENTLY LOADING PRIMITIVES INTO PROCESSORS OF A GRAPHICS SYSTEM

(75) Inventors: Aleksandr M. Movshovich, Santa Clara, CA (US); Brad A. Delanghe, San Jose, CA (US); David A. Baer, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 292 days.

(21) Appl. No.: 09/978,476

(22) Filed: Oct. 16, 2001

(65) Prior Publication Data

US 2003/0071830 A1 Apr. 17, 2003

(51) Int. Cl.[7] .................................. G06F 15/16
(52) U.S. Cl. .................... 345/502; 345/619; 345/553; 345/421; 345/423
(58) Field of Search ................... 345/619, 629, 345/620–624, 423, 500, 502, 553, 419, 421, 427, 441, 443

(56) References Cited

U.S. PATENT DOCUMENTS 5,808,627 A * 9/1998 Kelley et al. ............... 345/441
6,288,724 B1 * 9/2001 Kumar et al. .............. 345/621

FOREIGN PATENT DOCUMENTS

EP         0356103 A    2/1990

OTHER PUBLICATIONS

Foley, James D., et al; "Computer Graphics—Principles and Practice, Second edition in C"; Jul. 1997; Addison–Wesley Publishing Co, Reading, MA; section 3.6.3 "Edge Coherence and the Scan–Line Algorithm"; pp. 96–99.

* cited by examiner

*Primary Examiner*—Matthew C. Bella
*Assistant Examiner*—Hau Nguyen
(74) *Attorney, Agent, or Firm*—Sawyer Law Group LLP

(57) ABSTRACT

A method and system for more efficiently loading a plurality of primitives for a scene into processors of a computer graphics system is disclosed. Each primitive has a top and a bottom. The primitives are ordered based on the top of each primitive. The system and method include providing at least one input, a merge circuit, a distributor, a feedback circuit and a controller. The input(s) is for receiving data relating to each primitive. The merge circuit is coupled with the input (s) and adds the data for a primitive having a top not lower than a current line. The distributor is coupled with the feedback circuit, eliminates an expired primitive and outputs the data for remaining primitives after the expired primitive has been removed. The expired primitive has a bottom above the current line. The feedback circuit is coupled to the merge circuit and the distributor and re-inputs to the merge circuit the data for the remaining primitives. The controller controls the feedback circuit, the distributor and the merge circuit.

12 Claims, 6 Drawing Sheets

METHOD AND SYSTEM FOR EFFICIENTLY LOADING PRIMITIVES INTO PROCESSORS OF A GRAPHICS SYSTEM

FIELD OF THE INVENTION

The present invention relates to computer graphics system, and more particularly to a method and system for more efficiently loading primitives into processors for a computer graphics system.

BACKGROUND OF THE INVENTION

A conventional computer graphics system can display graphical images of objects on a display. The display includes a plurality of display elements, known as pixels, typically arranged in a grid. In order to display objects, the conventional computer graphics system typically breaks each object into a plurality of polygons, termed primitives. A conventional system then renders the primitives in a particular order.

Some computer graphics systems are capable of rendering the primitives in raster order. Such as system is described in U.S. Pat. No. 5,963,210, entitled "GRAPHICS PROCESSOR, SYSTEM AND METHOD FOR GENERATING SCREEN PIXELS IN RASTER ORDER UTILZING A SINGLE INTERPRETER" and assigned to the assignee of the present application. In such a system, all of the primitives intersecting a particular pixel are rendered for that pixel. The primitives intersecting a next pixel in the line are then rendered. Typically, this process proceeds from left to right in the line until the line has been rendered, then recommences on the next line. The frame is rendered line by line, until the frame has been completed.

In order to render the frame, the primitives are loaded into processors. Typically, all of the primitives starting at a particular line are loaded into the processors at the start of the line. After the line has completed processing, primitives which have expired are ejected. An expired primitive is one which can not be present on the next line. In other words, an expired primitive has a bottom that is no lower than the line that was just processed. Any new primitives for the next line are loaded at the start of the next line. The line is then processed as described above. This procedure continues until the frame is rendered.

Although the system is capable of rendering primitives in raster order, one of ordinary skill in the art will readily recognize that the processes of loading primitives and ejecting expired primitives each consume time and resources. In addition, in a complex scene, many primitives might expire at the end of a particular line and a large number of primitives might start at the next line. Ejecting the expired primitives and loading the new primitives might cause a significant delay in the pipeline. Furthermore, the primitives are all loaded into and processed by the processors. Thus, the number of primitives capable of being processed at a particular pixel is limited by the number of processors in the system. Typically, the number of processors is on the order of sixteen or thirty two. As a result, the number of primitives that overlap at a particular pixel and that can be processed is limited to sixteen or thirty two. The complexity of the frame is thereby limited. This limitation can be improved by increasing the number of processors. However, increasing the number of processors increases the space consumed by the graphics system, which is undesirable.

Accordingly, what is needed is a system and method for more efficiently loading primitives into the processors. The present invention addresses such a need.

SUMMARY OF THE INVENTION

The present invention provides a method and system for more efficiently loading a plurality of primitives for a scene into a plurality processors of a computer graphics system. Each of the plurality of primitives has a top and a bottom. The plurality of primitives is ordered based on the top of each of the plurality of primitives. The system and method comprise providing at least one input, a merge circuit, a distributor, a feedback circuit and a controller. The at least one input is for receiving data relating to each of the plurality of primitives. The merge circuit is coupled with the input and is for adding the data for a primitive having a top that is not lower than a current line. The distributor is coupled with the feedback circuit. The distributor eliminates an expired primitive and outputs the data for a remaining portion of the primitives after the expired primitive has been removed. The expired primitive has a bottom that is above the current line. The feedback circuit is coupled to the merge circuit and the distributor and re-inputs to the merge circuit the data for the remaining portion of the plurality of primitives. The controller controls the feedback circuit, the distributor and the merge circuit.

According to the system and method disclosed herein, the present invention provides a more efficient mechanism for loading primitives.

DETAILED DESCRIPTION OF THE INVENTION

The present invention relates to an improvement in computer graphics system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
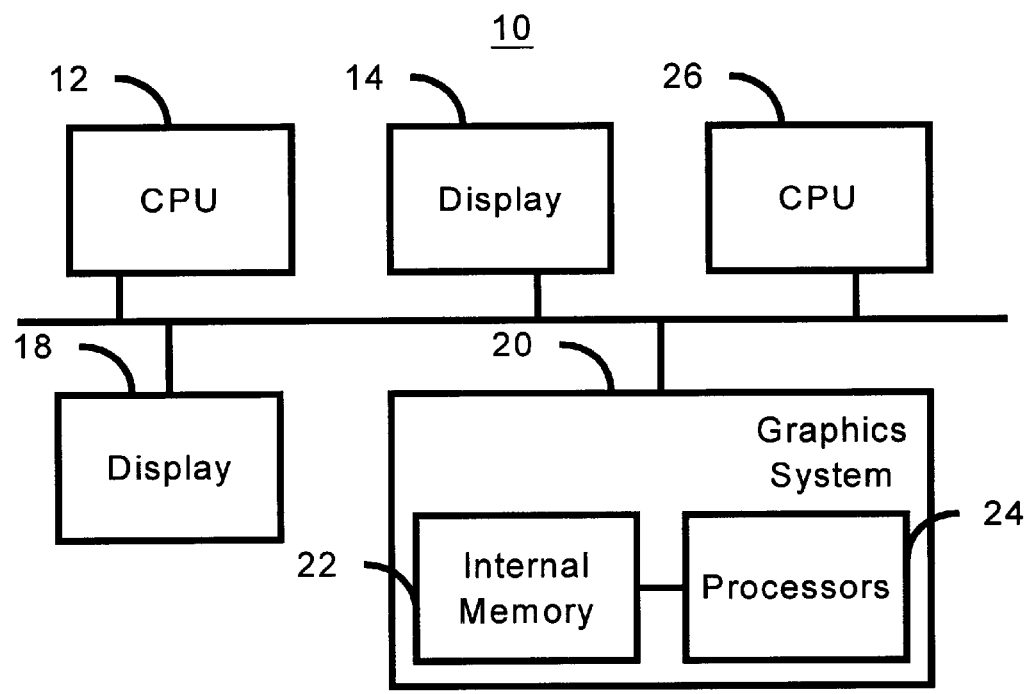
FIG. 1 is a block diagram of a computer system including a graphics system.

FIG. 1 is a block diagram of a computer system 10 including a computer graphics system 20. The computer system 10 also includes a central processing unit 12, a display 14, a user interface 16 such as a keyboard and/or mouse and a memory 18. The graphics system 20 is depicted as including an internal memory 22 and processors 24 that are coupled by a bus 23. The graphics system 20 typically has other components that are not shown for clarity.

Figure 2:
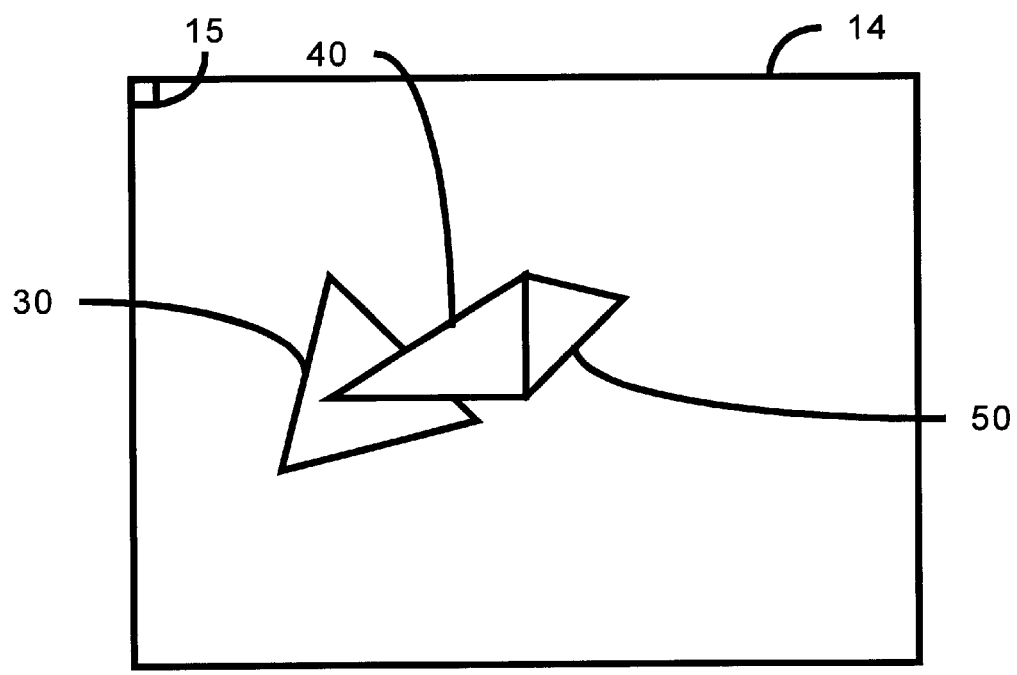
FIG. 2 is a diagram of a portion of a display including a plurality of primitives rendered for a frame.

FIG. 2 depicts a portion of the display 14. The display 14 includes a plurality of pixels. For clarity, only one pixel 15 is depicted. On the display are depicted primitives 30, 40 and 50. The primitives 30, 40 and 50 are typically part of a scene containing many primitives. The primitives in the scene may also overlap, as is shown in area 55 for primitives 30 and 40.

Referring to FIGS. 1 and 2, in order to render a scene on the display 14, the graphics system 20 must render the polygons. In a graphics system 20 described in U.S. Pat. No. 5,963,210, entitled "GRAPHICS PROCESSOR, SYSTEM AND METHOD FOR GENERATING SCREEN PIXELS IN RASTER ORDER UTILIZING A SINGLE INTERPRETER" and assigned to the assignee of the present application, the graphics system 20 renders the primitives 30, 40 and 50 in raster order. In other words, the graphics system 20 renders a scene pixel by pixel in raster order. Thus, in the area 55 where primitives 30 and 40 overlap, two primitives are rendered for each pixel. In order to render the scene, data for the primitives 30, 40 and 50 must be loaded from the internal memory 22 to the processors 24.

Figure 3:
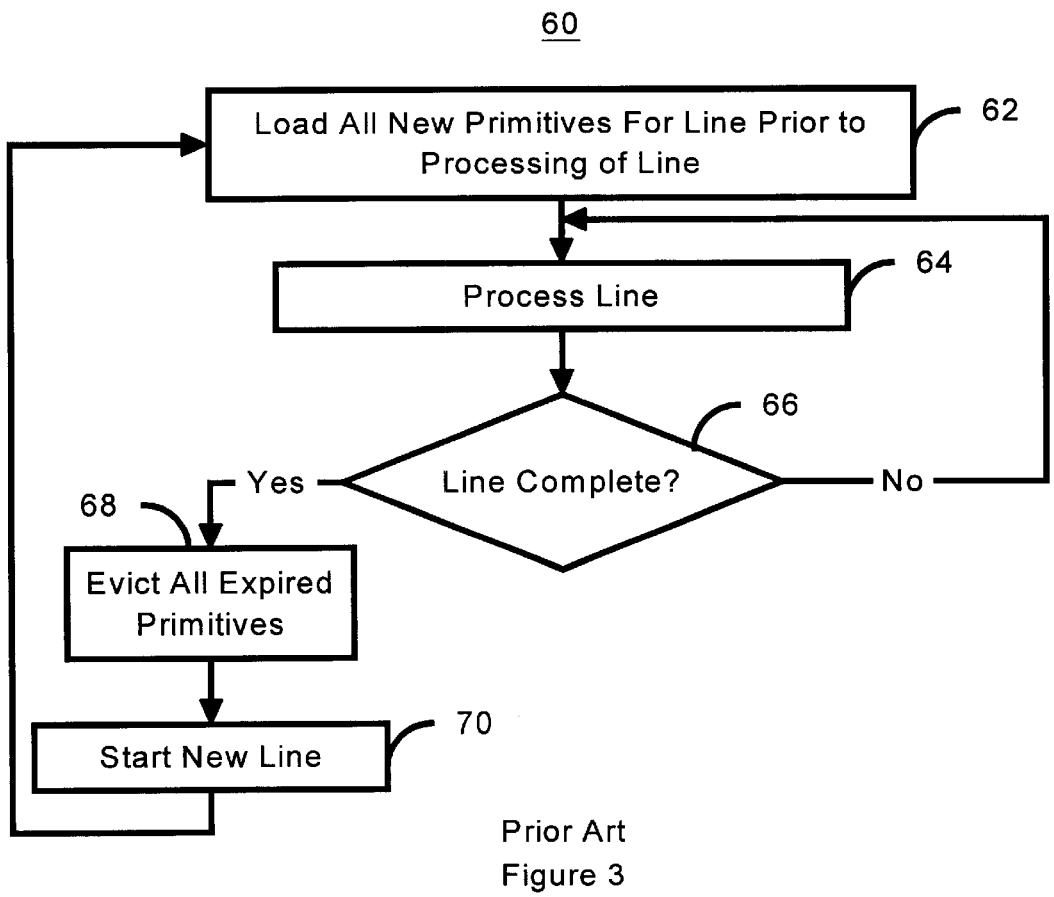
FIG. 3 is a flow chart a method for loading and evicting primitives from processors.

FIG. 3 depicts a high level flow chart of a method 60 for loading primitives used in the above-mentioned U.S. patent. At the start of the line, new primitives for the line are loaded into the processors 24, via step 62. The primitives are loaded from the internal memory 22 to the processors 24 Thus, primitives which commenced at a previous line and which will contribute to the current line remain in the processors 24. The line is then processed, via step 64. Step 64 may include performing interpolation, texture processing, anti-aliasing or other operations used in rendering the scene. It is determined whether processing of the line is complete, via step 66. If not, then processing continues in step 64. If the line is completed, then the primitives that have expired are evicted from some or all of the processors 24, via step 68. A primitive that has expired cannot contribute to the next line and thus has a bottom that is no lower than the current line being processed. The new line is then commenced, via step 70. Any new primitives are then loaded, via step 62. The method 60 thus repeats until the frame has been rendered.

Although the method and system shown in FIGS. 1 and 3 function, one of ordinary skill in the art will readily realize that there are limitations. Loading primitives in the processors 24 in step 62 requires time. Similarly, evicting primitives from the processor 24 in step 68 requires time. If a certain line differs significantly from a previous line, the number of primitives evicted and loaded may be quite large. This is particularly true if the bus 23 does not have sufficient throughput. As a result, the time required to perform steps 62 and 68 becomes significant, delaying completion of the frame by the graphics system 20. Furthermore, the number of primitives that can be processed for a particular pixel in a line is limited by the number of primitives that can be loaded into the processor 24. This number is the same as the number of processors 24, which is typically sixteen or thirty-two. Thus, the complexity of the scene that can be rendered is also limited. Although increasing the number of processors 24 addresses this problem, the space consumed by the graphics system 20 will also increased. Such an increase in space is undesirable.

The present invention provides a method and system for more efficiently loading a plurality of primitives for a scene into a plurality processors of a computer graphics system. Each of the plurality of primitives has a top and a bottom. The plurality of primitives is ordered based on the top of each of the plurality of primitives. The system and method comprise providing at least one input, a merge circuit, a distributor, a feedback circuit and a controller. The at least one input is for receiving data relating to each of the plurality of primitives. The merge circuit is coupled with the input and is for adding the data for a primitive having a top that is not lower than a current line. The distributor is coupled with the feedback circuit. The distributor eliminates an expired primitive and outputs the data for a remaining portion of the primitives after the expired primitive has been removed. The expired primitive has a bottom that is above the current line. The feedback circuit is coupled to the merge circuit and the distributor and re-inputs to the merge circuit the data for the remaining portion of the plurality of primitives. The controller controls the feedback circuit, the distributor and the merge circuit.

The present invention will be described in terms of a particular computer system, a particular computer graphics system and a particular set of processors. However, one of ordinary skill in the art will readily recognize that this method and system will operate effectively for other computer system, other computer graphics systems, and other numbers of processors.

Figure 4:
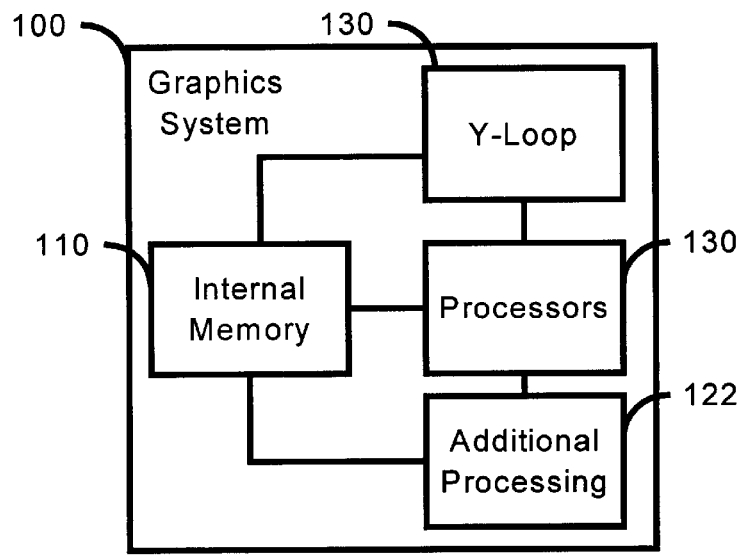
FIG. 4 is a block diagram of one embodiment of a computer graphics system using one embodiment of a system in accordance with the present invention.

To more particularly illustrate the method and system in accordance with the present invention, refer now to FIG. 4, depicting one embodiment of a computer graphics system 100 using one embodiment of a system in accordance with the present invention. The computer graphics system 100 is preferably used in the computer system 10 in place of the computer graphics system 20. The computer graphics system 100 includes a system 130 in accordance with the present invention for more efficiently loading primitives into processors in the computer graphics system 100. The system 130 is termed herein a y-loop system 130. The computer graphics system 100 also includes an internal memory 100, a processor block 120 and additional processing circuitry 122. The additional processing circuitry 122 could include one or more interpolators, sorters, antialiasing units and other circuitry actually used in rendering the frame. Some embodiments of the additional processing circuitry 122 are described in the above-mentioned U.S. patent. The internal memory 110 is preferably a random access memory ("RAM") 110. Data for the primitives are preferably loaded into the RAM 110. This data preferably includes an identifier for each primitive, the top and bottom coordinates for each primitive and can include texture, color, or other data used in processing the primitive.

Figure 5:
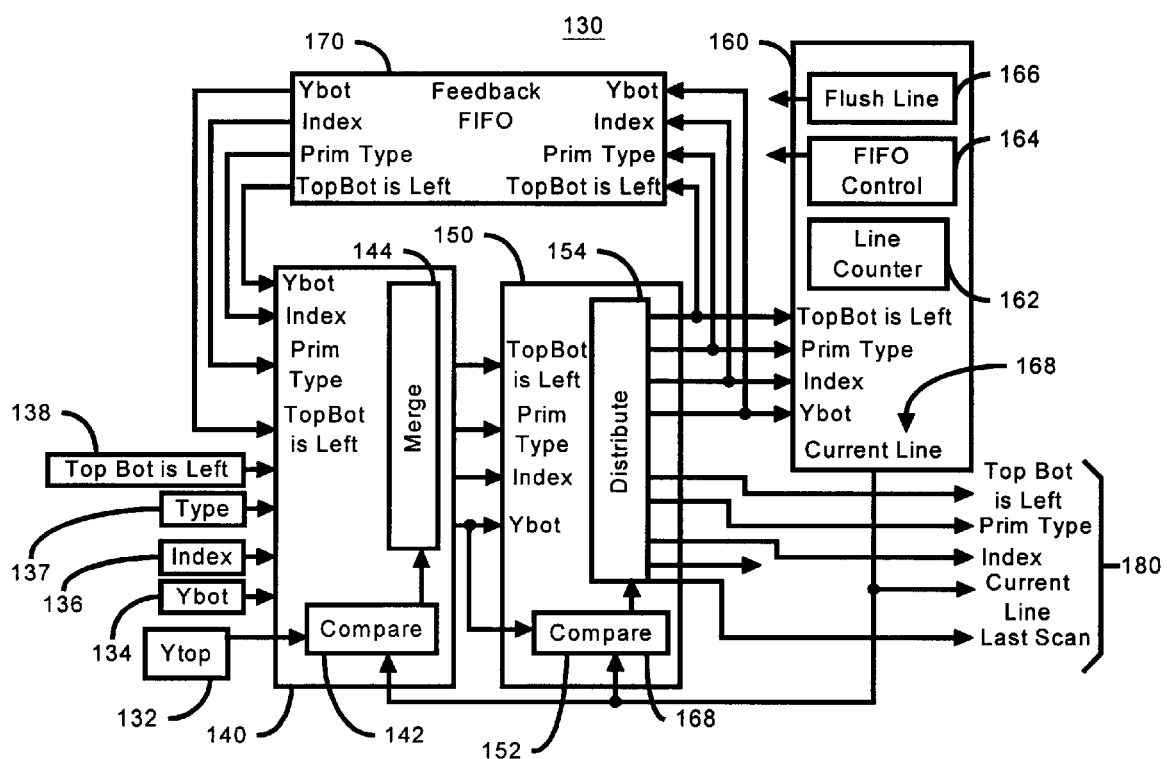
FIG. 5 is a block diagram of one embodiment of a system in accordance with the present invention for more efficiently loading primitives into processors in a computer graphics system.

FIG. 5 is a block diagram of one embodiment of the system 130 in accordance with the present invention for more efficiently loading primitives into processors in a computer graphics system, such as the computer graphics system 100. The y-loop 130 includes a y-loop merge 140, a y-loop distributor 150, a controller 160 and y-loop feedback 170. The feedback 170 is preferably a first-in-first-out buffer (FIFO) 170. In a preferred embodiment, the feedback FIFO 170 preferably has a depth that is the same as the number of virtual processors in the graphics system 100, preferably, one thousand and twenty-four. In a preferred embodiment, the number of actual, physical processors in the processor block 24 is different from the number of virtual processors. The number of virtual processors is set by the number of processors the graphics system 100 appears to have because of the configuration and functions of the processors actually used. Because the graphics system 100 has one thousand and twenty-four virtual processors, this is the upper limit of primitives that can be processed for a particular pixel. The actual processors in the processor block 120 is substantially less. In a preferred embodiment, there are sixteen processors in the processor block 120. However, nothing prevents the use of another number of processors and/or another number of virtual processors.

The y-loop merge 140 is used to merge data for new primitives with data for primitives that have been fed back through the feedback FIFO 170, as discussed below. The y-loop merge includes a compare block 142 and a merge block 144. The primitives input to the y-loop merge 140 are ordered based on y-values, or height in the frame. Thus, the primitives input to the y-loop merge 140 are preferably ordered based on the position of their top, shown as y-top 132 in FIG. 5. The data input to the y-loop merge 140 includes the y-top 132 (top y-value of the primitive), the y-bot 134 (bottom y-value of the primitive), the index 136 which identifies the primitive, the primitive type 137 and the top-bot-is-left 138. The primitive type 137 is either the number of the primitive, an empty primitive if the frame is empty or the end of the frame if the primitive is the last in the frame. The top-bot-is-left 138 indicates the orientation of the primitive being rendered. Thus, top-bot-is-left 138 indicates whether the side of the primitive which connects the top vertex and bottom vertex is on the left or right boundary. Other data for the primitive, such as the color or texture values remain stored in the internal memory 110. The y-loop merge 140 merges data input for new primitives that start at a current line with data for primitives that have been looped through the y-loop merge 140 using the merge block 144. Thus, the y-loop merge 140 also has as an input the current line 168. In order to determine whether to accept a new primitive, the y-loop merge 140 uses the compare block 142 to compare the y-top 132 with the current line 168. If the y-top 132 is not less than the current line 168, then the y-loop merge 140 accepts the primitive and provides the data to the merge block 144.

The distributor 150 is coupled to and receives data from the y-loop merge 140. The data received includes the y-bot 134, the index 136, the primitive type 137 and the top-bot-is left 138. The distributor 150 includes a compare block 152 and a distribute block 154. The distributor 150 evicts primitives that have expired and distributes data for primitives that have not expired. To do so, the distributor 150 uses the compare block 152 to compare the bottom of each primitive with the current line and provides an evict signal 156 to the distribute block 154. The evict signal 156 indicates whether to evict a particular primitive. If the bottom of the primitive, the y-bot 134, is less than the current line then the primitive will be evicted.

The distribute block 154 provides data for primitives that are not evicted to two components. First, the distribute block 154 outputs the index 136 to the processors 120 (not shown in FIG. 5), via output 180. The distribute block 154 also preferably outputs the primitive type 137 and the top-bot-is left 138 to the processors 120. The current line 168 is also provided to the processors 120 from the controller 160. Thus, the processors 120 receive data for the primitives.

The distribute block 154 also feeds back data to the feedback FIFO 170, as well as providing the data to the control 160 through lines 182. The feedback FIFO 170 is thus coupled both to the output of the distributor 150 and to the input of the y-loop merge 140. Because it preserves the order of the data that was provided to it, the feedback FIFO 170 will retain the ordering of the primitives, from top to bottom. In addition, the feedback FIFO 170 will feed data for primitives which have not expired back to the input of the y-loop 130.

Figure 6:
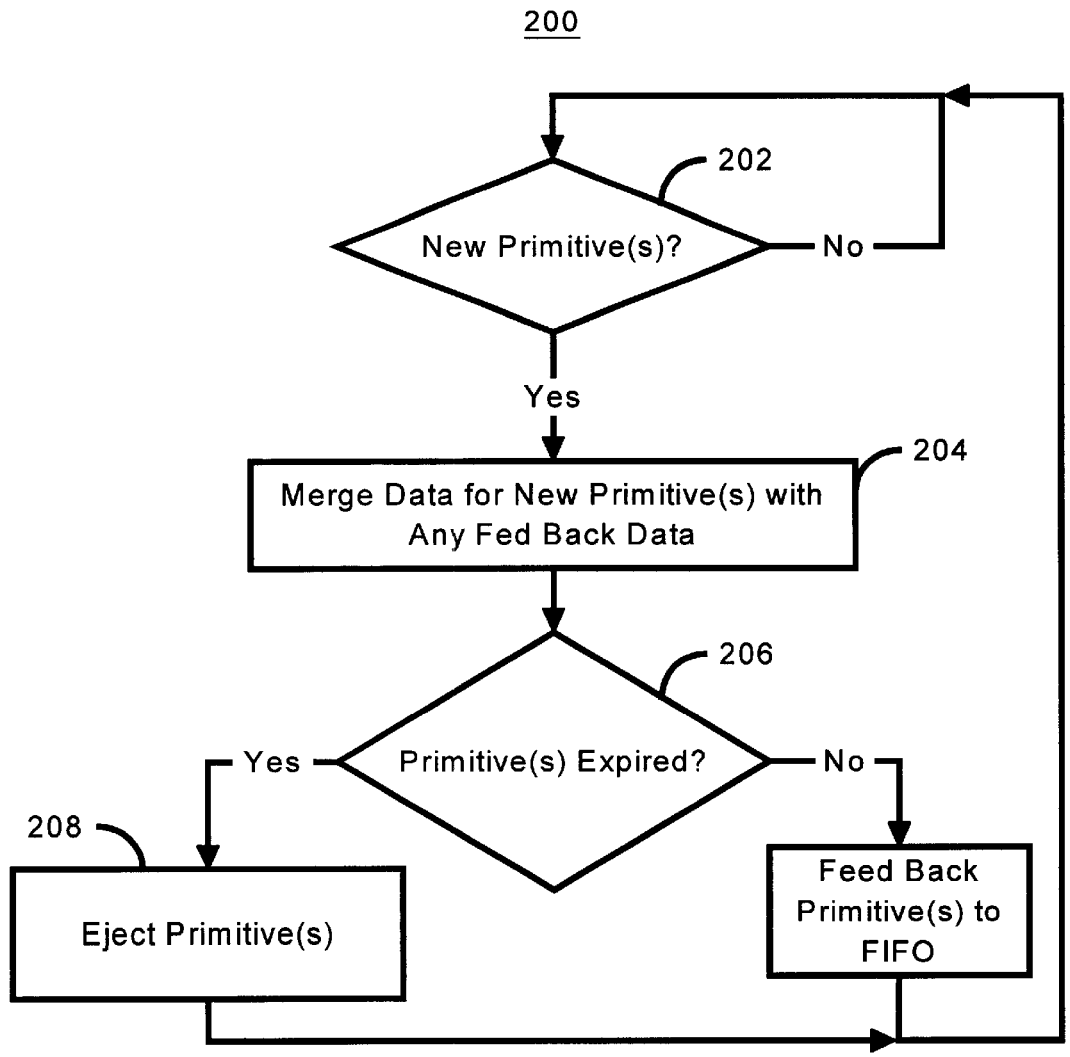
FIG. 6 is a high-level flow chart of one embodiment of a method in accordance with the present invention for more efficiently loading primitives into processors in a computer graphics system.

FIG. 6 is a high-level flow chart of one embodiment of a method 200 in accordance with the present invention for more efficiently loading primitives into processors 120 in a computer graphics system 100. The method 200 preferably uses the system 100. Consequently, the method 200 is described in the context of the computer system 100 and the graphics system 100.

It is determined whether any new primitives start on the current line using the y-loop merge 140, via step 202. Preferably step 202 is performed by determining whether the top of the primitive, as determined by the y-top 132, is less than or equal to the current line 168. If any new primitives commence on the current line, then they are merged with data for certain previous primitives using the merge block 144, via step 204. Using the distributor 150, it is determined whether any of the primitives have expired, via step 206. Step 206 is preferably performed by determining whether the bottom of the primitive, as determined by the y-bot 134, is less than the current line 168. If so, then the expired primitives are ejected, via step 208. If no primitives have expired or once the expired primitives have been ejected, the remaining primitives are output to the processors 120 and fed back to the feedback FIFO 170, via step 210. The method 200 may then repeat until the frame has been rendered. Thus, primitives which will contribute to the frame for a particular number lines will be looped through the feedback FIFO 170 the particular number times. The primitive need not be reloaded into the y-loop 130.

Using the y-loop 130 and the method 200, primitives can be continuously loaded and ejected. As a result, any delays at the end of a line due to ejecting and loading of primitives can be reduced or eliminated. Thus, loading of primitives to the processors 120 in the graphics system 100 can be made more efficient. Furthermore, because the feedback FIFO 170 can hold data for a large number of primitives, the y-loop 130 can be used with a large number of virtual (or actual) processors. This feature allows more primitives to overlap a single pixel. Consequently, limitations in the complexity of the scene are reduced.

Figure 7A:
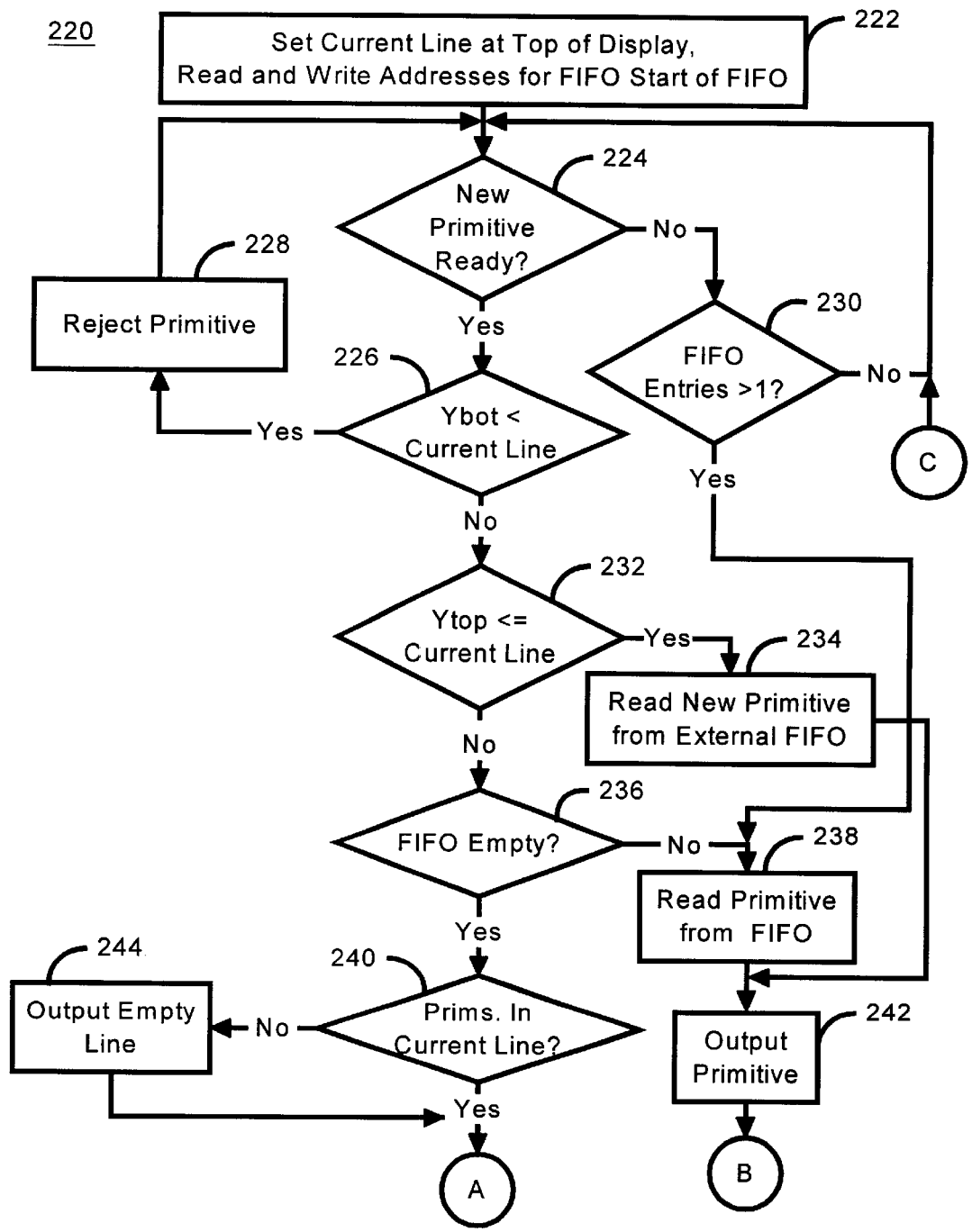
FIGS. 7A and 7B depict a more detailed flow chart of one embodiment of a method in accordance with the present invention for more efficiently loading primitives into processors in a computer graphics system.
Figure 7B:
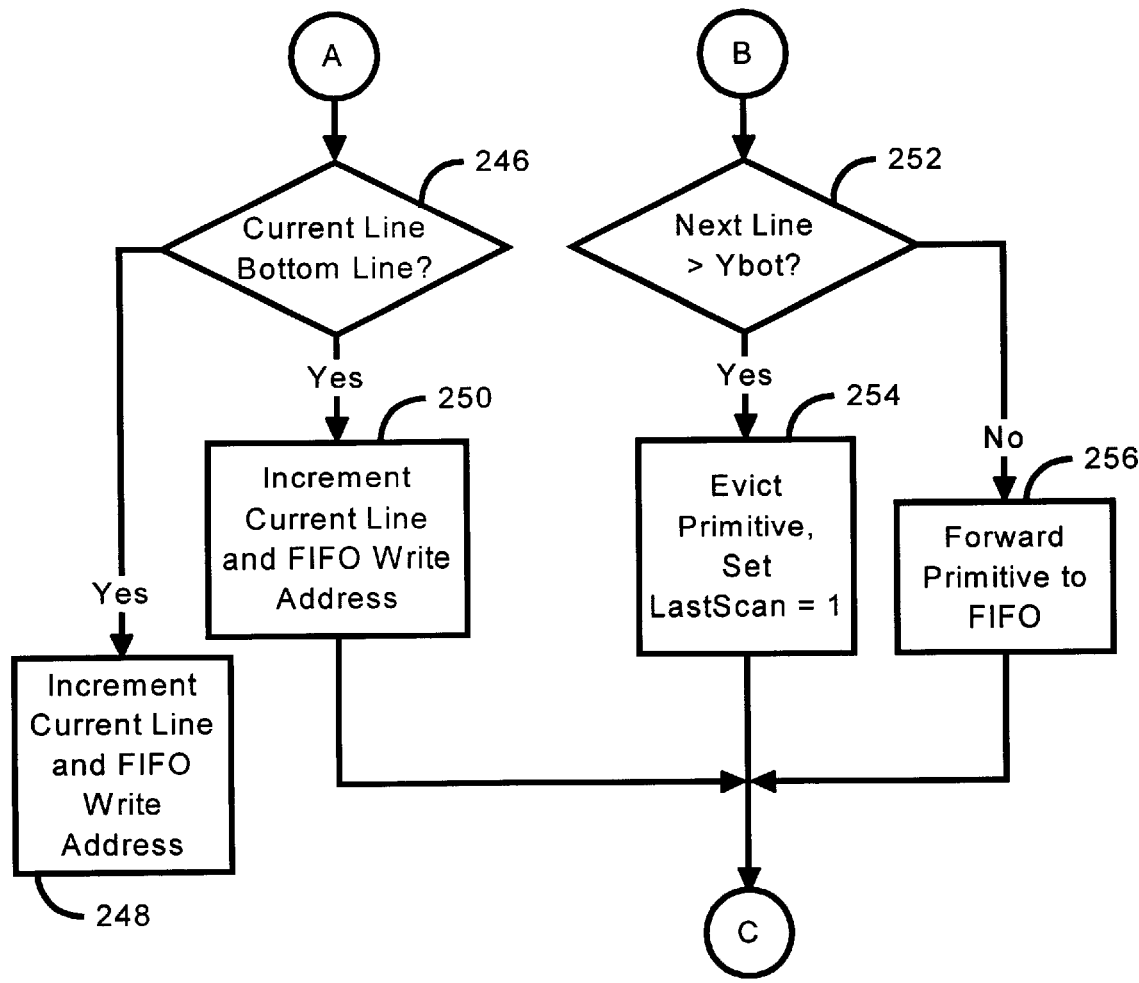

FIGS. 7A and 7B depict a more detailed flow chart of one embodiment of a method 210 in accordance with the present invention for more efficiently loading primitives into processors in a computer graphics system. The method 220 preferably uses the system 100. Consequently, the method 220 is described in the context of the graphics system 100, the y-loop 130 in FIGS. 3 and 4.

The method 220 commences by setting the current line value 168 to the top of the frame, and setting the read and write addresses for the feedback FIFO 170 to the start of the feedback FIFO 170, via step 222. Step 222 is performed once per frame. It is determined whether a new primitive in a FIFO (not shown) connected to the y-loop merge 140 is ready, via step 224. The FIFO holds the primitives to be rendered in order from lowest to highest y-top 132. If a new primitive is ready, then for the new primitive, it is determined whether the y-bot 134 is less than the current line 168, via step 230. If so, then because the primitive actually ends above the current line, then the primitive is rejected, via step 228. The method 220 would then return to step 224. If the y-bot 134 is not less than the current line 168, then using the compare block 142 it is determined whether y-top 132 is less than or equal to the current line 168, via step 236. If so, then the new primitive starts at least at the current line, so the primitive is read into the y-loop merge 140 from the FIFO which is connect to the y-merge 140, via step 234. The new primitive would then be output to the processors using the distribute block 154 of the distributor 150, via step 242.

If it is determined in step 232 that the y-top 132 is not less than or equal to the current line 168, then it is determined whether the feedback FIFO 170 is empty, via step 236. If not, then the primitive is read from the feedback FIFO 170 into the y-merge 140, via step 238. The primitive would then be output by the distributor, via step 238.

If it is determined in step 236 that the feedback FIFO 170 is empty, then it is determined whether any primitive were processed for the current line 168, via step 240. If not, then the empty line is output, via step 244. If there were primitives during the current line 168 or once the empty line is output, it is determined whether the current line 168 is the bottom line, via step 246. If so, then the input stream is flushed and the current line is set to the top line, via step 248. The method 220 could then start again for the new frame. If the current line 168 is not the bottom of the frame, then the current line is incremented and the address in the feedback FIFO 170 from which data is read is incremented, via step 250. Step 224 would then be returned to.

If it is determined in step 224 that a new primitive is not ready to be loaded, then it is determined whether the feedback FIFO 170 has more than one entry, via step 230. If not, then the method returns to step 224. If so, then the primitive(s) from the feedback FIFO 170 are read, via step 238. The primitive would then be output in step 242.

Once either from the feedback FIFO 170 or a new primitive is output in step 242, using the compare block 152, it is determined whether the line after the current line is below the bottom line of the primitive, via step 252. If so, then primitive is evicted via step 254. Otherwise, the primitive is provided to the feedback FIFO 170 using the distributor 154.

Thus, the primitives are provided to the processors 120 through the y-loop 140. Using the y-loop 130 and the method 220, primitives can be continuously loaded and ejected. Primitives that contribute to multiple lines of a scene are looped through the y-loop 140 using the feedback FIFO 170, while primitives which have expired are evicted using the distributor 150. As a result, delays at the end of a line due to ejecting and loading of primitives can be reduced or eliminated. Thus, loading of primitives to the processors 120 in the graphics system 100 can be made more efficient. Furthermore, because the FIFO 170 can hold data for a large number of primitives, the y-loop 130 can be used with a large number of virtual (or actual) processors. This feature allows more primitives to overlap a single pixel. Consequently, limitations in the complexity of the scene are reduced.

A method and system has been disclosed for more efficiently loading primitives into processors for a graphics system. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for more efficiently loading a plurality of primitives for a scene into a plurality processors of a computer graphics system, each of the plurality of primitives having a top and a bottom, the plurality of primitives being ordered based on the top of each of the plurality of primitives, the system comprising:

a merge circuit for receiving data relating to each of the plurality of primitives adding the data for a primitive having a top that is not lower than a current line;

a distributor, for eliminating an expired primitive, the expired primitive having a bottom that is above the current line and for outputting at least a portion of the data for a remaining portion of the plurality of primitives after the expired primitive has been removed, the at least a portion of the data output by the distributor controlling loading of the plurality of primitives by the plurality of processors;

a feedback circuit, coupled to the merge circuit and the distributor, for re-inputting to the merge circuit the data for the remaining portion of the plurality of primitives; and a controller for controlling the feedback circuit, the distributor and the merge circuit;

wherein information for the remaining portion of the plurality of primitives are provided from the distributor for loading to the plurality of processors.

2. The system of claim 1 wherein the feedback circuit further includes a first inn first out ("FIFO") buffer.

3. The system of claim 1 wherein each of the plurality of primitives includes a y-top that marks the top of each of the plurality of primitives and wherein the merge circuit compares the y-top for a primitive of the plurality of primitives to a current y-value for the current line and merges the primitive if the y-top is not greater than the current line.

4. The system of claim 1 wherein each of the plurality of primitives includes a y-bottom that marks at a particular line the bottom of each of the plurality of primitives and wherein the distributor circuit compares the y-value for a primitive of the plurality of primitives to a next line y-value for the current line and discards the primitive if the y-bottom is not greater than the a next line y-value.

5. The system of claim 1 wherein the at least a portion of the data for each of the plurality of primitives is an identifier for each of the plurality of primitives.

6. A method for more efficiently loading a plurality of primitives for a scene into a plurality processors of a computer graphics system, each of the plurality of primitives having a top and a bottom, the plurality of primitives being ordered based on the top of each of the plurality of primitives, the method comprising the steps of:

(a) determining whether the top of at least one new primitive of the plurality of primitives is not lower than a current line;

(b) merging data for the at least one new primitive if the top is not lower than the current line using a merge circuit;

(c) eliminating an expired primitive and outputting at least a portion of data for a remaining portion of the plurality of primitives after the expired primitive has been removed using a distributor, the expired primitive having a bottom that is above the current line, the data output by the distributor controlling loading of the plurality of primitives by the plurality of processors;

(d) re-inputting from the distributor to the merge circuit data for the remaining portion of the plurality of primitives using a feedback circuit;

wherein information for the remaining portion of the plurality of primitives are provided from the distributor for loading to the plurality of processors.

7. The method of claim 6 wherein each of the plurality of primitives includes a y-top that marks a top of each of the plurality of primitives and wherein the determining step (a) further includes the step of:

(a1) comparing the y-top for a primitive of the plurality of primitives to a current y-value for the current line and wherein the merging step (b) further includes the step of (b1) merging the primitive if the y-top is not greater than the current line.

8. The method of claim 6 wherein each of the plurality of primitives includes a y-bottom that marks at a particular line the bottom of each of the plurality of primitives and wherein the eliminating step (c) further includes the steps of:

(c1) comparing the y-value for a primitive of the plurality of primitives to a next line y-value for the current line and (c2) discarding the primitive if the y-bottom is not greater than the next line y-value.

9. The method of claim 6 wherein the at least a portion of the data for each of the plurality of primitives is an identifier for each of the plurality of primitives.

10. The method of claim 6 wherein the computer graphics system further includes an internal memory, and wherein the method further includes the steps of:

(e) continuously loading the plurality of primitives into the internal memory; and (f) providing a primitive of the plurality of primitives to a processor of the plurality of processors only if the distributor outputs the data for the primitive.

11. The system of claim 1 wherein the current line is a current line being rendered.

12. The method of claim 6 wherein the current line is a current line being rendered.

* * * * *